No. 725,873. PATENTED APR. 21, 1903.
C. E. RHOADES.
FEED MECHANISM.
APPLICATION FILED MAR. 14, 1902.
NO MODEL.

Witnesses
Palmer A. Jones.
Ida Thiebout

Inventor
Charles E. Rhoades
By
Luther V. Moulton
Attorney

UNITED STATES PATENT OFFICE.

CHARLES E. RHOADES, OF BATTLECREEK, MICHIGAN, ASSIGNOR TO GROCERS' SPECIALTY MANUFACTURING COMPANY, LIMITED, OF BATTLECREEK, MICHIGAN, A CORPORATION OF MICHIGAN.

FEED MECHANISM.

SPECIFICATION forming part of Letters Patent No. 725,873, dated April 21, 1903.

Application filed March 14, 1902. Serial No. 98,268. (No model.)

*To all whom it may concern:*

Be it known that I, CHARLES E. RHOADES, a citizen of the United States, residing at Battlecreek, in the county of Calhoun and State of Michigan, have invented certain new and useful Improvements in Feed Mechanism; and I do hereby declare the following to be a full, clear, and exact description of the invention, such as will enable others skilled in the art to which it appertains to make and use the same.

My invention relates to improvements in feed mechanism for feeding grains or other comminuted material; and its object is to provide the same with certain new and useful features hereinafter more fully described, and particularly pointed out in the claims, reference being had to the accompanying drawings, in which—

Figure 1:
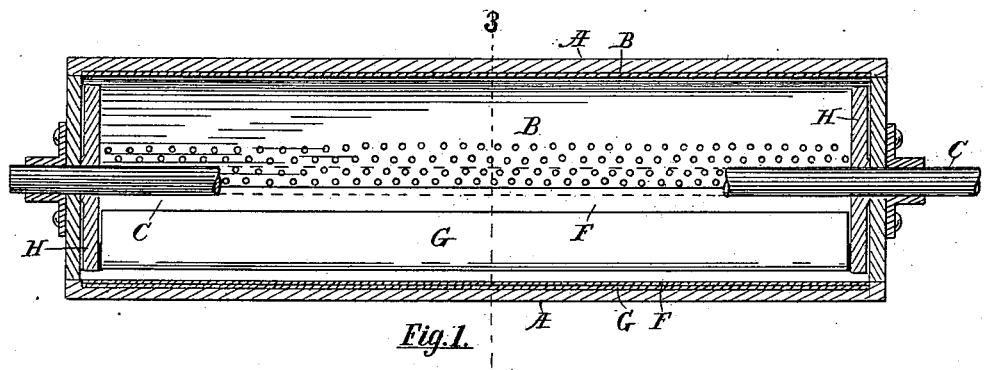
Figure 2:
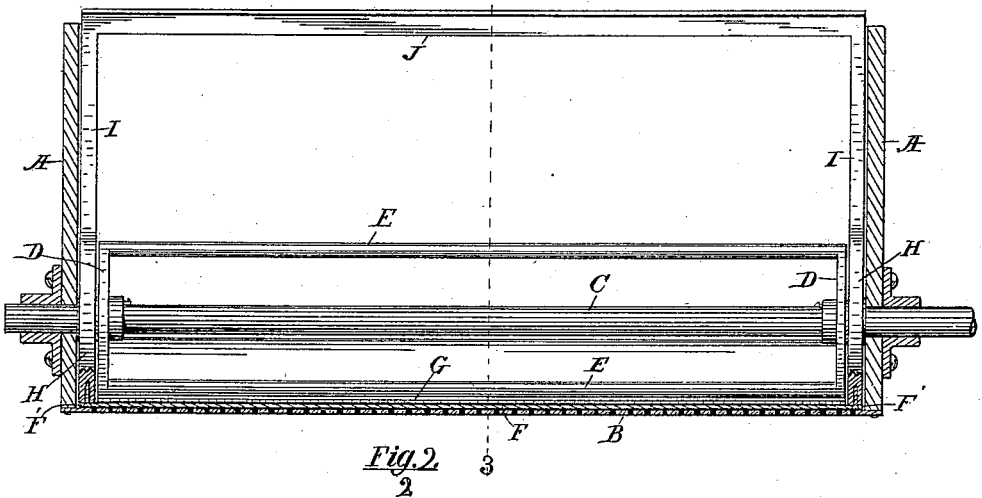
Figure 3:
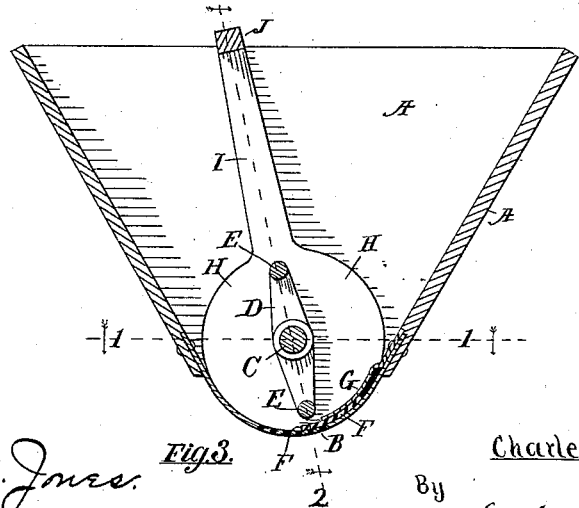

Figure 1 is a horizontal section on the line 1 1 of Fig. 3 with parts broken away. Fig. 2 is a longitudinal section on the line 2 2 of Fig. 3, and Fig. 3 a transverse section on the line 3 3 of Figs. 1 and 2.

Like letters refer to like parts in all the figures.

A is a suitable form of hopper to hold the material to be fed and provided with a concave bottom B, having perforations throughout its middle portion and directly below the shaft C. This shaft is in the axis of the bottom B and is provided with transverse arms D near the ends of the hopper and connected by parallel bars E, which traverse near the bottom B as the shaft C is revolved by any convenient means.

F is an imperforate plate curved transversely to fit the inner surface of the bottom B and slidable thereon and of suitable width to cover and stop all of the openings in the bottom B. To adjust this plate and hold the same, circular heads H are pivoted on the shaft C, to the rim of which heads the plate F is secured. These heads are provided with arms I, connected by a cross-bar J, by which the heads are rotated on the shaft to adjust the plate F.

G is an inner plate, a portion of which extends upon the inner surface of the plate F and is curved to fit the same, whereby the plate F may be run back between the plate G and the bottom B. This plate G is secured at one edge to the side of the hopper, whereby it is held in place, and the portion overlapping the plate F extends between the heads and to near the perforations in the bottom B. This plate G frictionally engages the plate F and presses it down upon the bottom B, and thus prevents any of the material from working between the plates and at the same time frictionally maintains the proper adjustment of the plate F to wholly cut off a greater or less number of the perforations in the bottom, and thus regulate the feed.

The shaft C, arms D, and bars E constitute an agitator which stirs the material to be fed and while rotating maintains a constant flow through the perforations in the bottom B.

Having thus fully described my invention, what I claim, and desire to secure by Letters Patent, is—

1. The combination of a hopper, a rotative agitator journaled in the hopper, a concave bottom to the hopper concentric with the axis of the agitator and having perforations in its lower portion, a cylindrical imperforate plate to close a greater or less number of said perforations and means for adjusting the plate, substantially as described.

2. The combination of a hopper, a shaft journaled in the hopper near the bottom thereof, a perforated bottom to the hopper concentric with the axis of the shaft, transverse arms and bars on the shaft, a cylindrical imperforate plate slidably engaging the bottom to wholly close a part or all of the perforations in the bottom and means for adjusting the said plate, substantially as described.

3. The combination of a hopper, a rotative agitator journaled in the hopper, a perforated bottom concentric with the axis of the agitator, heads pivoted on the agitator-shaft, arms extending upward from the heads, a bar connecting the arms and an imperforate plate slidable on the perforated bottom and attached to the heads, substantially as described.

4. The combination of a hopper, a shaft journaled in the hopper, transverse arms attached to the shaft, parallel bars connecting the arms, heads pivoted on the shaft, arms on the heads, a bar connecting said arms, a perforated bottom to the hopper, concentric with the axis of the shaft, a cylindrical imperforate plate slidably engaging the bottom, and attached to the heads, substantially as described.

5. The combination of a hopper, an agitator journaled in the hopper, a perforated bottom concentric with the axis of the agitator, a cylindrical imperforate plate slidably engaging the bottom, means for adjusting said plate, and a fixed inner plate overlapping the adjusted plate, and frictionally engaging the same, substantially as described.

In testimony whereof I affix my signature in presence of two witnesses.

CHARLES E. RHOADES.

Witnesses:
S. D. GILBERT,
J. WHITNEY WORRICK.